United States Patent [19]

Matsuoka et al.

[11] Patent Number: 4,664,985

[45] Date of Patent: May 12, 1987

[54] THIN-FILM ELECTROLUMINESCENT ELEMENT

[75] Inventors: Tomizo Matsuoka, Neyagawa; Yosuke Fujita, Ashiya; Jun Kuwata, Hirakata; Atsushi Abe, Ikoma; Tsuneharu Nitta, Katano, all of Japan

[73] Assignee: Matsushita Electric Industrial Co., Ltd., Osaka, Japan

[21] Appl. No.: 654,841

[22] Filed: Sep. 25, 1984

[30] Foreign Application Priority Data

Sep. 30, 1983 [JP] Japan ................................ 58-183360

[51] Int. Cl.[4] ........................ B32B 9/00; B32B 19/00; H01J 1/62; H01J 63/04

[52] U.S. Cl. .................................... 428/690; 428/691; 428/917; 313/509

[58] Field of Search ............... 428/690, 691, 701, 702, 428/917; 313/509

[56] References Cited

U.S. PATENT DOCUMENTS

| | | | |
|---|---|---|---|
| 2,732,313 | 1/1956 | Cusano et al. | 428/690 X |
| 3,107,315 | 10/1963 | Wolfe et al. | 313/509 X |
| 4,211,813 | 7/1980 | Gravisse et al. | 428/690 X |
| 4,416,933 | 11/1983 | Antson et al. | 428/698 X |
| 4,418,118 | 11/1983 | Tindors | 428/698 X |

*Primary Examiner*—Nancy Swisher
*Attorney, Agent, or Firm*—Spencer & Frank

[57] ABSTRACT

An electroluminescent element, especially a thin-film electroluminescent element in which the dielectric film layer provided on at least one side of an electroluminor layer is essentially composed of the materials represented by the following compositional formula:

$$x(Ti_{1-s}A_sO_2) \text{ and } y(Sr_{1-t}B_tO)$$

wherein A is at least one member selected from the group consisting of Zr, Hf and Sn, and B is at least one member selected from the group consisting of Mg, Ba and Ca. In the above formula, $x+y=100$ mol %, $0\leqq s<1$, $0\leqq t<1$, $40\leqq x\leqq 80$ mol %, and $20\leqq y\leqq 60$ mol %, but x and y cannot be equal to each other and also s and t cannot be 0 at the same time.

9 Claims, 1 Drawing Figure

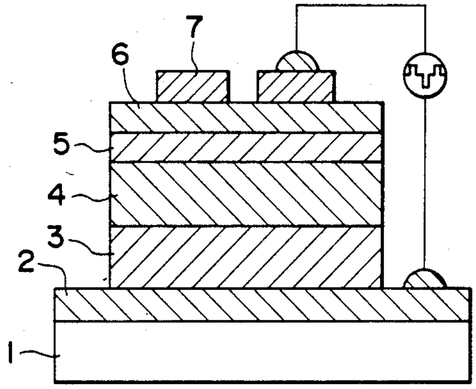
7
6
5
4
3
2
1

THIN-FILM ELECTROLUMINESCENT ELEMENT

TECHNICAL FIELD

The present invention relates to an electroluminescent element. More particularly, the present invention relates to a thin-film electroluminescent element actuated upon application of an alternating current. Such electroluminescent element has characteristic utility for the realization of so-called flat panel displays. For instance, such element can be advantageously used for the character and graphic terminal displays of personal computers and also finds wide applications to the field of office automation electronics.

BACKGROUND ART

The electroluminescent element (hereinafter referred to as EL element) which emits light when energized by an AC field has a laminate structure consisting of a thin film electroluminor or phosphor layer, a thin film dielectric layer or layers provided on one or both sides of said phosphor layer and two electrode layers holding said layers. The phosphor layer used in such EL element is basically composed of such material as ZnS, ZnSe or $ZnF_2$ in which Mn or a rare earth fluoride is added as luminescent center. For instance, a phosphor layer composed of ZnS and having Mn added as a luminescent center is capable of providing a luminance of 3,500 to 5,000 $Cd/m^2$ at most with application of an AC voltage of 5 KHz. As the dielectric material, $Y_2O_3$, $SiO_2$, $Si_3N_4$, $Al_2O_3$ and $Ta_2O_5$ are mostly used. As for the layer thickness, usually the ZnS layer is of a thickness in the range of 5,000 to 7,000 Å and the dielectric layer thickness is in the range of 4,000 to 8,000 Å.

In the case of AC drive, the voltage applied to the element is divided between the ZnS layer and the dielectric layer. Since the EL element is equivalent to two series-connected capacitors, the relation of $\epsilon_i V_i/t_i = \epsilon_z V_z/t_z$ (where $\epsilon$ is the dielectric constant, V is applied voltage, t is thickness, i is dielectric and z is ZnS) holds, and in view of this relation, each partial voltage is found inversely proportional to the dielectric constant if $t_i = t_z$. Therefore, since $\epsilon_i$ of a dielectric such as $Y_2O_3$ is about 4 to 25 and $\epsilon_z$ of ZnS is about 9, only 30 to 70% of the whole applied voltage is given to the ZnS layer. Thus, in such element, a voltage of higher than 200 V needs to be applied for pulse drive at several KHz. Such high voltage puts too much load on the drive circuits and necessitates the use of a specific high voltage resistant drive IC, which leads to an elevated production cost. Naturally, an element which can be driven at as low a voltage as possible and which is high in production yield and excellent in quality and reliability has been desired in the industries.

For lowering the drive voltage, the dielectric layer is required to have specific characteristics that are discussed below. In view of the relation of voltage division shown above, it is understood that $\epsilon_i/t_i$ must be large. After the start of light emission, the increment of applied voltage is exclusively applied to the dielectric layer, so that it is an essential requirement for an excellent dielectric film to have a large value of $V_{ib}$ (dielectric breakdown voltage). Therefore, the figure of merit $\gamma$ of the dielectric film is expressed by: $\gamma = \epsilon_i V_{ib}/t_i = \epsilon_i E_{ib}$ (wherein $E_{ib}$ is dielectric breakdown field strength of the dielectric film). As seen from the above equation, $\gamma$ is proportional to the electric charges accumulated per unit area at the time of dielectric breakdown of the dielectric film. The greater $\gamma$, the more a stable low-voltage drive becomes possible. Here, let it be supposed that two EL elements have been produced in which the thickness of both phosphor layer and dielectric layer are the same, and also suppose that one of the elements has a dielectric film of the following charactersitics: $\epsilon_i = 100$, $E_{ib} = 1\times10^6$ V/cm, and $\gamma = 100\times10^6$ V/cm and the other element has the dielectric characteristics of $\epsilon_i = 50$, $E_{ib} = 3\times10^6$ V/cm and $\gamma = 150\times10^6$ V/cm, then naturally, the former element, where $\epsilon_i = 100$, can emit light at a lower voltage since both elements have the same dielectric thickness. On the other hand, in the case of the latter element where $\epsilon_i = 50$ and $E_{ib} = 3\times10^6$ V/cm, which is higher in dielectric breakdown voltage, the film thickness can be reduced to $\frac{1}{3}$ of the former element if both elements are equal in dielectric strength. Accordingly, the capacity of the dielectric is tripled, making $\epsilon_i = 150$ equivalently. Therefore, a higher figure of merit makes it possible to obtain an element that can emit light at a lower voltage, regardless of $\epsilon_i$. It is desirable that the value of $\gamma$ be as large as possible. More specifically, as a measure of low-voltage light emission, it is suggested that $\gamma$ be more than 10 times the value of $14\times10^6$ V/cm obtained by substituting $\epsilon_z = 9$ and $E_{zb} = 1.6\times10^6$ V/cm of ZnS for $\epsilon_i$ and $E_{ib}$ in the above-shown equation.

The figure of merit of the conventional dielectric films is of the order of $50\times10^6$ V/cm in the case of $Y_2O_3$, $30\times10^6$ V/cm in the case of $Al_2O_3$ and $70\times10^6$ V/cm in the case of $Si_3N_4$. These values are too small for realizing low-voltage light emission.

More recently, use of thin films mainly composed of $PbTiO_3$ or $Pb(Ti_{1-x}Zr_x)O_3$ with a high dielectric constant for the dielectric layer has been proposed. In these films, $\epsilon_i$ can be over 150 but on the other hand $E_{ib}$ is as small as $0.5-0.6\times10^6$ V/cm, so that it is necessary to greatly increase the film thickness as compared with films using conventional dielectric materials. Therefore, in view of practical reliability of the element, it is required that said dielectric film has a thickness greater than 15,000 Å, for up to 6,000 Å in thickness of the ZnS film. Generally, in the use of such material, the grains in the film tend to grow causing cloudiness because of high substrate temperature at the time of film formation in addition to large film thickness. In an X,Y matrix display using such cloudy films, light is let out from the non-excited segments because the light emitted from excited segments is scattered, resulting in a degraded image quality.

In view of the above, the present inventors have proposed an EL element using a dielectric film mainly composed of $SrTiO_3$, which film is high in both $E_{ib}$ and $E_{ib}\times\epsilon_i$, suited for low-voltage drive and free of clouding.

Reduction of drive voltage is desirable from the viewpoints of reliability and cost of the drive circuits, but no technical criteria has been made on this matter. It has therefore been required to conduct further research on said $SrTiO_3$ dielectric film from its compositional aspect and to obtain the improved characteristics.

SUMMARY OF THE INVENTION

An object of the present invention is to obtain an electroluminescent element having a dielectric film which is suited for low-voltage drive and high in reliability.

The dielectric film provided on at least one side of the electroluminescent element according to the present invention is essentially composed of the materials of the following compositional formula: $x(Ti_{1-s}A_sO_2)$ and $y(Sr_{1-t}B_tO)$ in which $x+y=100$ mol%, $0\leqq s<1$, $0\leqq t<1$, $40\leqq x\leqq 80$ mol%, and $20\leqq y\leqq 60$ mol% (but a case of $x=y=50$ mol% and $s-y=0$ is excluded). A represents at least one member selected from the group consisting of Zr, Hf and Sn, and B represents at least one member selected from the group consisting of Mg, Ba and Ca.

BRIEF DESCRIPTION OF THE DRAWING

The attached drawing is a sectional view of a thin-film electroluminescent element according to an embodiment of the present invention.

BEST MODE FOR CARRYING OUT THE INVENTION

The present invention has added a compositional improvement to the previously proposed $SrTiO_3$ dielectric film to obtain excellent and improved characteristics for the low-voltage drive and reliability of the electroluminescent element.

To achieve this improvement, ceramic sputtering targets were prepared by greatly changing the $TiO_2$ to SrO mixing ratio in the composition from the stoichiometrical ratio of 1:1 and also replacing part of the Ti or Sr with a tetravalent or divalent element, and the preparations into films were made by magnetron RF sputtering. The chemical analysis of the composition of the produced films showed substantial agreement of the film composition with that of the target.

In the dielectric films of said compositions and structure, for instance in the $TiO_2$-SrO film, it was found that the excellent $\epsilon_i$ or $E_{ib}$ characteristics are obtained with a composition deviating from the stoichiometrical composition and also the value of $\epsilon_i \times E_{ib}$ is higher than that of the $SrTiO_3$ film having the stoichiometrical composition. The obtained dielectric film is transparent and free of any cloudiness due to growth of grains as in the $SrTiO_3$ film, and when such dielectric film is used for an EL element, there can be obtained an EL element with excellent image quality. It was further found that even higher $\epsilon_i$ or $E_{ib}$ can be obtained to give a characteristic dielectric film by replacing the position of Ti or Sr in the $TiO_2$-SrO composition with other tetravalent or divalent element. There was disclosed another characteristic feature of said three-component or four-component system in that the dielectric film formed by using such system remains free of cracks such as seen in the $TiO_2$-SrO film during the heat treatment. Cracks are induced by the growth of grains in the dielectric film. Slight cracks do not affect the normal function of the EL element, but it is of course desirable that no crack is present from the viewpoint of reliability of the element. In some cases, though very rare, cracking in the film may cause disconnection of the matrix electrode, reducing the reliability of the element. Thus, use of said three-component or four-component dielectric film enables high-yield production of the EL having no crack in the dielectric film and high reliability.

Hereinafter, the present invention will be described more definitely by way of its embodiments with reference to the accompanying drawing.

As shown in the drawing, on a glass substrate 1 having a transparent ITO (tin added indium oxide) electrode 2, a dielectric film 3 with a composition of $x(TiO_2)$ and $y(SrO)$ ($x+y=100$ mol%) was deposited by magnetron RF sputtering to a thickness of 5,000 Å, the deposition being made by changing the x to y ratio in the composition in the following seven ways: 30 to 70, 40 to 60, 50 to 50, 60 to 40, 70 to 30, 80 to 20, and 90 to 10. A mixed gas of $O_2$ and Ar ($O_2$ partial pressure: 25%) was used as the sputtering gas, and the gas pressure during sputtering was adjusted to $8\times10^{-1}$ Pa. Used as the target was a ceramic plate mixed with said composition and sintered at 1400° C. The substrate temperature was 400° C. The obtained films were transparent and showed no cloudiness in all cases of composition.

The values of $\epsilon_i$ and $E_{ib}$ of each composition were examined at the point when the dielectric film was formed. Then ZnS and Mn were simultaneously deposited on the dielectric film by resistance heating to form a ZnS:Mn electroluminor layer 4 with a thickness of 5,000 Å. A heat treatment of ZnS:Mn was conducted in vacuo at 620° C. for one hour. As a protection for said ZnS:Mn film, a $Ta_2O_5$ film 5 was deposited thereon to a thickness of 400 Å by electron beam deposition. On said film 5 was further deposited a 1,000 Å thick $PbNb_2O_6$ film 6 by magnetron RF sputtering. An $O_2$-Ar mixed gas containing 25% of $O_2$ was used as sputtering gas. The sputtering gas pressure was 3 Pa. A $PbNb_2O_6$ ceramic plate was used as the target. The substrate temperature was 380° C. Lastly, an Al film 7 was deposited to a thickness of 1,000 Å by resistance heating as an upper electrode, thus completing an EL element.

The EL elements were driven by an AC pulse at a repetitive frequency of 5 KHz and their voltage-luminance characteristics were determined. Table 1 shows the electrical properties and light emission charactersitics as determined for the respective dielectric compositions.

TABLE 1

| No. | x:y (mol %) in $x(TiO_2)$:y(SnO) composition | $\epsilon_i$ | V/cm $E_{ib}$ ($\times 10^6$) | V/cm $\epsilon_i \times E_{xb}$ ($\times 10^6$) | Luminance cd/m$^2$/ Applied voltage V |
|---|---|---|---|---|---|
| 1 | 30:70 | 40 | 2.0 | 80 | 3450/140 |
| 2 | 40:60 | 115 | 1.8 | 207 | 3500/110 |
| 3 | 50:50 | 130 | 1.5 | 195 | 3500/108 |
| 4 | 60:40 | 145 | 1.5 | 217 | 3500/106 |
| 5 | 70:30 | 160 | 1.5 | 240 | 3500/105 |
| 6 | 80:20 | 135 | 1.5 | 202 | 3500/107 |
| 7 | 90:10 | 90 | 1.0 | 90 | 3400/114 |

In the above table, the voltage at which saturation luminance of 3400–3500 Cd/m$^2$ was reached is given as an indication of light emission characteristics.

As can be seen from the table, $\epsilon_i$ increases as x, i.e., $TiO_2$ component, becomes greater in amount than the stoichiometrical composition, and it begins to decrease as the amount of x reaches and exceeds 80 mol%. Conversely speaking, $\epsilon_i$ decreases as the $TiO_2$ component becomes less than 50 mol%, and it decreases sharply when the $TiO_2$ component is lessened to 30 mol%. On the other hand, $E_{ib}$ increases sharply when the $TiO_2$ component becomes less than 50 mol%, but it remains substantially constant when the proportion of said component is in the range of 50 to 80 mol%. However, $E_{ib}$ decreases when said component reaches 90 mol%. From the above-observed dependency of $\epsilon_i$ and $E_{ib}$ on the variation of compositional ratio, it was found that when the x:y ratio is between 40:60 and 80:20, a higher value of figure of merit ($\epsilon_i \times E_{ib}$) of the dielectric film than that of the $SrTiO_3$ film where $x=y=50$ mol% can be obtained. As for the emission characteristics, the voltage required for achieving the saturation luminance of 3400–3500 Cd/m$^2$ can be made lower than that required in the case of $SrTiO_3$ film having the stoichiometrical composition when the amount of x is in the range defined by $50<x\leq 80$ in relation to $\epsilon_i$. However, when the x:y ratio is 40:60, the required voltage becomes higher than when said ratio is 50:50 because of small $\epsilon_i$. This is due to the same dielectric film thickness of the respective elements shown in Table 1. In this case, however, since $E_{ib}$ is high and hence $\gamma$ is accordingly increased, the dielectric film thickness can be reduced to 4,100 Å for equalizing $E_{ib}$ to that of the 50:50 (x:y) film. Accordingly, $\epsilon_i$ becomes equivalent to 156, and 3500 Cd/m$^2$ can be obtained at 106 V, allowing a lower voltage drive than in the case of the 50:50 (x:y) film.

Judging from the foregoing results, it is noted that a more excellent dielectric film for low-voltage drive type EL elements than a $SrTiO_3$ film can be obtained from a composition of $x(TiO_2)$ and $y(SrO)$ ($x+y=100$ mol%) when the amounts of x and y are in the ranges defined by $40\leq x\leq 80$ and $20\leq y\leq 60$ mol% (but x and y are not equal to each other).

In said $TiO_2$-SrO system in the above-defined compositional region of excellent characteristics, Ti or Sr in the composition can be partly replaced with other elements. First, the case where Sr was partly substituted with Mg, Ba and Ca will be discussed. The way of evaluation of dielectric film, the structure and preparation conditions of the element and the measurement condition of light emission characteristics were same as in the case of said $TiO_2$-SrO system.

Table 2 shows the results obtained when Sr was partly replaced with Mg. In the table is included a new characteristic item-percentage of occurrence of cracking (determined from the number of the samples which cracked in the total 10 samples tested in each run of test) (hereinafter referred to as crack rate) in the dielectric film at the time of annealing of the ZnS:Mn film 4 formed on the dielectric film 3. The light emission characteristics are not shown in this table.

TABLE 2

| No. | Mol % of x, y and t in $x(TiO_2)$,-$y(Sr_{1-t}Mg_tO)$ | $\epsilon_i$ | V/cm $E_{ib}$ (× 10$^6$) | V/cm $\epsilon_i \times E_{ib}$ (× 10$^6$) | Crack rate % |
|---|---|---|---|---|---|
| 8 | 70, 30, 0 | 160 | 1.5 | 240 | 40 |
| 9 | 70, 30, 0.025 | 155 | 1.6 | 248 | 10 |
| 10 | 70, 30, 0.05 | 150 | 1.8 | 270 | 0 |
| 11 | 70, 30, 0.1 | 130 | 2.0 | 260 | 0 |
| 12 | 70, 30, 0.25 | 108 | 2.2 | 238 | 0 |
| 13 | 70, 30, 0.4 | 80 | 2.5 | 200 | 0 |
| 14 | 70, 30, 0.6 | 50 | 2.5 | 125 | 0 |
| 15 | 40, 60, 0.4 | 70 | 2.8 | 196 | 0 |
| 16 | 40, 60, 0.6 | 40 | 2.8 | 112 | 0 |

As can be seen from Table 2, partial replacement of Sr with Mg causes a decreasing tendency of the value of $\epsilon_i$ and an increasing tendency of the value of $E_{ib}$, and it is noted that a better figure of merit than the $TiO_2$-SrO system can be obtained in the region of 5 to 10% replacement with Mg. The crack rate is reduced to ¼ by only 2.5% replacement of Sr with Mg, and no crack occurs at 5% replacement. When Sr replacement with Mg exceeds 60%, the value of $\epsilon_i$ becomes too small and the figure of merit drops below the desired level of $140\times 10^6$ V/cm (10 times the performance index of ZnS) suited for low-voltage light emission. Accordingly, the appropriate rate of replacement of Sr with Mg is 40% or less. In this region of composition, it is possible to produce low-voltage drive EL elements suffering no crack at the time of annealing in a high yield.

Table 3 shows the results obtained from partial replacement of Sr with Ba.

TABLE 3

| No. | Mol % of x, y and t in $x(TiO_2)$,-$y(Sr_{1-t}Ba_tO)$ | $\epsilon_i$ | V/cm $E_{ib}$ (× 10$^6$) | V/cm $\epsilon_i \times E_{ib}$ (× 10$^6$) | Crack rate % |
|---|---|---|---|---|---|
| 17 | 70, 30, 0 | 160 | 1.5 | 240 | 40 |
| 18 | 70, 30, 0.025 | 164 | 1.5 | 246 | 0 |
| 19 | 70, 30, 0.05 | 170 | 1.4 | 238 | 0 |
| 20 | 70, 30, 0.1 | 177 | 1.2 | 212 | 0 |
| 21 | 70, 30, 0.25 | 190 | 1.0 | 190 | 0 |
| 22 | 70, 30, 0.4 | 200 | 0.9 | 180 | 0 |
| 23 | 70, 30, 0.6 | 212 | 0.8 | 170 | 0 |
| 24 | 70, 30, 0.8 | 225 | 0.6 | 135 | 0 |
| 25 | 40, 60, 0.6 | 181 | 1.1 | 199 | 0 |
| 26 | 40, 60, 0.8 | 195 | 0.7 | 136 | 0 |

Quite contrary to the case of Mg replacement, $\epsilon_i$ increases while $E_{ib}$ decreases proportionally to the rate of Ba replacement. The crack rate can be reduced to 0% by 2.5% replacement. Judging from the figure of merit, the appropriate rate of Ba replacement of Sr can be defined to be within 60%.

Ca replacement of Sr has been also studied by following the same procedure as in the cases of Mg and Ba replacement discussed above. In this case, $\epsilon_i$ and $E_{ib}$ showed the same tendency as in the case of Mg. As regards cracks, only 2.5% replacement could produce a remarkable effect, reducing the crack rate to about ¼, as in the case of Mg. The appropriate range of Ca replacement of Sr is within 30%. Beyond this range, the figure of merit becomes smaller than 140 and the film tends to have cloudiness. The film of the composition of 70 mol% $TiO_2$ and 30 mol% ($Sr_{0.7}Ca_{0.3}O$) showed the following characteristic values: $\epsilon_i=90$; $E_{ib}=2.1\times 10^6$ V/cm; $\epsilon_i\times E_{ib}=189\times 10^6$ V/cm.

How about the effect of substitution of Ti with Zr, Sn and Hf? Generally, relacement of Ti with other tetravalent elements produces a greater effect against cracking than in the case of replacement of Sr. The crack rate could be easily reduced to 0% by 2.5% replacement with any of Zr, Sn and Hf. Table 4 shows the results obtained from replacement of Ti with Zr.

TABLE 4

| No. | Mol % of x, y and s in $x(Ti_{1-s}Zr_sO_2)$,-$y(SrO)$ | $\epsilon_i$ | V/cm $E_{ib}$ (× 10$^6$) | V/cm $\epsilon_i \times E_{Ib}$ (× 10$^6$) | Crack rate % |
|---|---|---|---|---|---|
| 27 | 70, 30, 0 | 160 | 1.5 | 240 | 40 |
| 28 | 70, 30, 0.025 | 157 | 1.6 | 251 | 0 |
| 29 | 70, 30, 0.05 | 150 | 1.8 | 270 | 0 |
| 30 | 70, 30, 0.1 | 136 | 1.9 | 258 | 0 |
| 31 | 70, 30, 0.25 | 120 | 2.0 | 240 | 0 |
| 32 | 70, 30, 0.4 | 100 | 2.2 | 220 | 0 |
| 33 | 70, 30, 0.6 | 84 | 2.3 | 193 | 0 |
| 34 | 70, 30, 0.8 | 55 | 2.4 | 132 | 0 |
| 35 | 40, 60, 0.6 | 75 | 2.5 | 187 | 0 |
| 36 | 40, 60, 0.8 | 50 | 2.6 | 130 | 0 |

The effect of replacement of Ti with Zr is of the same tendency as in the case of replacement of Sr with Mg. It can be learned from the table taht the appropriate rate of replacement with Zr is within 60%. In the case of Sn and Hf, there is seen a typical tendency that the value of $\epsilon_i$ decreases sharply while the value of $E_{ib}$ increases exceedingly with their replacement of Ti. For instance, the composition of 70 mol% ($Ti_{0.6}Sn_{0.4}O_2$) and 30 mol% SrO (involving 40% replacement of Ti with Sn) gives the characteristic values of $\epsilon_i=45$, $E_{ib}=4.2\times10^6$ V/cm, and $\epsilon_i\times E_{ib}=189\times10^6$ V/cm, and the composition of 70 mol% ($Ti_{0.6}Hf_{0.4}O_2$) and 30 mol% SrO provides the characteristics of $\epsilon_i=50$, $E_{ib}=3.6\times10^6$ V/cm, and $\epsilon_i\times E_{ib}=180\times10^6$ V/cm. In both cases of Sn and Hf, the appropriate rate of replacement was determined to be within 40%.

As viewed above, any of said three-component systems is effective against cracking and can provide a dielectric film with a typically high value of $\epsilon_i$ or $E_{ib}$. The figure of merit of the obtained film is also equal to or higher than that of the $TiO_2$-SrO films. Thus, the above-described three-component dielectric film is essential for producing an EL element suited for low-voltage drive like $TiO_2$-SrO system and also high in reliability. It is also possible in principle to emply a four-component system by selecting the respective replacement rates in the defined ranges for the purpose of combining the advantages of the respective elements used for partial replacement of Ti or Sr in the $TiO_2$-SrO composition.

According to the present invention, as described above, the dielectric film layer of thin-film electroluminescent element is constituted from a film of a dielectric material having a composition of $x(Ti_{1-s}A_sO_2)$ and $y(Sr_{1-t}B_tO)$ (where A=Zr, Hf or Sn, and B=Mg, Ba or Ca), which film is high in figure of merit and also resistant to cracking, so that it is possible to produce low-voltage drive type electroluminescent element of high quality and reliability in a good yield. This leads to the improved reliability and reduced production cost of drive circuits, and thus the present invention is of great industrial value.

What is claimed is:

1. A thin-film electroluminescent element in which a thin-film dielectric layer is provided on at least one side of a thin-film phosphor layer and a voltage is applied to said phosphor and dielectric layers through two electrode layers at least one of which electrode layers is pervious to light, said dielectric layer being a mixed composition comprising a first component x of the formula $Ti_{1-s}A_sO_2$ in which a part of Ti is substituted with Zr, s being an atomic ratio; and a second component y of the formula $Sr_{1-t}B_tO$ in which a part of Sr is substituted with an element B, t being an atomic ratio;

wherein $x+y=100$ mol%, $s\leqq0.6$, $0\leqq t<1$ $40\leqq x\leqq80$ mol%, and $20\leqq y\leqq60$ mol%, $x\neq y$, s and t are not zero at the same time, and B is at least one element selected from the group consisting of Mg, Ba and Ca.

2. A thin-film electroluminescent element in which a thin-film dielectric layer is provided on at least one side of a thin-film phosphor layer and a voltage is applied to said phosphor and dielectric layers through two electrode layers at least one of which electrode layers is pervious to light, said dielectric layer being a mixed composition comprising a first component x of the formula $Ti_{1-s}A_sO_2$ in which a part of Ti is substituted with Sn, s being an atomic ratio; and a second component y of the formula $Sr_{1-t}B_tO$ in which a part of Sr is substituted with an element B, t being an atomic ratio;

wherein $x+y=100$ mol%, $s\leqq0.6$, $0\leqq t<1$ $40\leqq x\leqq80$ mol%, and $20\leqq y\leqq60$ mol%, $x\neq y$, s and t are not zero at the same time, and B is at least one element selected from the group consisting of Mg, Ba and Ca.

3. A thin-film electroluminescent element in which a thin-film dielectric layer is provided on at least one side of a thin-film phosphor layer and a voltage is applied to said phosphor and dielectric layers through two electrode layers at least one of which electrode layers is pervious to light;

said dielectric layer being a mixed composition comprising a first component x of the formula $Ti_{1-s}A_sO_2$ in which a part of Ti is substituted with an element A, s being an atomic ratio; and a second component y of the formula $Sr_{1-t}B_tO$ in which a part of Sr is substituted with an element B, t being an atomic ratio;

wherein $x+y=100$ mol%, $0<s<1$, $0\leqq t<1$, $40<x<80$ mol%, $20<y<60$ mol%, $x\neq y$, and A is at least one element selected from the group consisting of Zr, Hf and Sn, and B is at least one element selected from the group consisting of Mg, Ba and Ca.

4. A thin-film electroluminescent element according to claim 3, wherein Sr is partly substituted with Mg in the range defined by $0<t\leqq0.4$.

5. A thin-film electroluminescent element according to claim 3, wherein Sr is partly substituted with Ba in the range defined by $0<t\leqq0.6$.

6. A thin-film electroluminescent element according to claim 3, wherein Sr is partly substituted with Ca in the range defined by $0<t\leqq0.3$.

7. A thin-film electroluminescent element according to claim 3, wherein Ti is partly substituted with Zr in the range defined by $0<s\leqq0.6$.

8. A thin-film electroluminescent element according to claim 3, wherein Ti is partly substituted with Sn in the range defined by $0<s\leqq0.4$.

9. A thin-film electroluminescent element according to claim 3, wherein Ti is partly substituted with Hf in the range defined by $0<s\leqq0.4$.

* * * * *